United States Patent Office 3,438,862
Patented Apr. 15, 1969

3,438,862
PREPARATION OF BACTERIAL
LIPOPOLYSACCHARIDES
Elizabeth Work, London, England, assignor to
Twyford Laboratories Limited
No Drawing. Filed May 17, 1966, Ser. No. 550,608
Claims priority, application Great Britain, May 24, 1965,
21,840/65
Int. Cl. C12d *13/08, 13/04, 13/00*
U.S. Cl. 195—31                                     21 Claims

ABSTRACT OF THE DISCLOSURE

A stable water-soluble lipopolysaccharide is produced by growing a lysine-requiring mutant of gram-negative bacteria in a culture medium containing a limited concentration of lysine, separating a cell-free liquid from the resulting culture, separating lipopolysaccharide-complex from the cell-free liquid, treating the complex with a mixture of phenol and water, removing the phenol and recovering the lipopolysaccharide from the remaining aqueous material.

---

This invention is for improvements in or relating to polysaccharides and has particular reference to an improved process for the preparation of bacterial lipopolysaccharides.

The lipopolysaccharides (also known as endotoxins) are high molecular weight components of cells of gram-negative bacteria. They are biologically active, possessing pyrogenic and toxic activity. Other more desirable biological properties of the lipopolysaccharides are antigenicity, stimulation of antibody production to other antigens and stimulation of non-specific resistance to various diseases. Nonspecific resistance is the protection afforded by a microbial derivative against microorganisms not directly related to the bacteria from which the endotoxin is obtained. The subject of bacterial endotoxins is discussed in for example "Bacterial Endotoxins," edited by M. Landy & W. Braun, published by the Institute of Microbiology, Rutgers, The State University, New Jersey, United States of America in 1964.

Lipopolysaccharides have been prepared in a crude state by extraction of bacterial cells with hot aqueous phenol or with aqueous ether. Considerable difficulty is encountered in such processes in removing all extraneous substances such for example as nucleic acids, proteins, peptides and amino acids. Purer compounds have been obtained by first preparing cell walls from bacteria and then extracting them with suitable liquids. However, the preparation of cell walls from bacteria is a complicated multi-stage process which is not suitable for large scale preparation of lipopolysaccharides (see for example, J. Allsop & E. Work, Biochem. J., 87, 512, 1963).

We have now discovered that substantially pure lipopolysaccharides may be readily prepared by using as source an extracellular lipoprotein-lipopolysaccharide.

When lysine-requiring mutants of gram-negative bacteria such for example as *Escherichia coli* are grown under certain conditions of lysine limitation they excrete into the culture medium various lipids including a lipoprotein-lipopolysaccharide with the immunological activity of endotoxin. Other compounds which are excreted include diaminopimelic acid, nucleotides, and flavins. Examples of mutants of *Escherichia coli* which behave in this manner are 26–26 and ATCC 12408. These lysine-requiring mutants lack the enzyme meso-2,6-diaminopimelate decarboxylase. Under certain conditions these mutants have the ability to excrete large amounts of diaminopimelic acid during growth.

The lipids, including the extracellular lipoprotein-lipopolysaccharide, are produced by the mutants of *Escherichia coli* when they are grown under conditions which give rise to excretion of diaminopimelic acid and flavins, namely when the lysine concentration is limited and under conditions of high aeration.

Accordingly the present invention provides a process for the preparation of a lipopolysaccharide which process comprises growing a lysine-requiring mutant of a gram-negative species of bacteria in a suboptimal concentration of lysine, obtaining a cell-free liquid from the resulting culture, separating lipopolysaccharide complex from the cell-free liquid, obtaining lipopolysaccharide by treatment of the complex with a mixture of a phenol and water and removing the phenol.

The preferred gram-negative species of bacteria is *Escherichia coli* which is grown in a suboptimal concentration of lysine under conditions such that diaminopimelic acid accumulates in the culture medium.

The lysine concentration may vary from 20 to 500 mg./litre and the lysine-requiring mutant is preferably grown under conditions of high aeration. The pH of the culture may be from between 5 and 8. The lysine-requiring mutant is preferably grown for 24 to 48 hours at a temperature of from 25° to 40° C. Normally when lysine-requiring mutants of *Escherichia coli* are used the fermentation will be stopped when growth and formation of diaminopimelic acid has stopped.

The culture medium comprises a source of assimilable carbon, a source of assimilable nitrogen, inorganic salts and lysine. The source of assimilable carbon may be one or more carbohydrates such for example as glycerol, mannitol, glucose, sucrose, lactose and/or cane sugar molasses and/or one or more organic acids such for example as fumaric, citric and/or lactic acid. Glycerol is the preferred carbon source. The source of assimilable nitrogen may be, for example, ammonia, ammonium sulphate, ammonium chloride, ammonium phosphate, ammonium carbonate, ammonium acetate, a nitrate or urea. The inorganic salts may be, for example, potassium dihydrogen phosphate, potassium mono-hydrogen phosphate, magnesium sulphate and sodium sulphate. The lysine which is present in the medium may be added per se or, more usually, in the form of a salt, such for example as the hydrochloride, or in the form of a material containing lysine as for example cornsteep liquor.

A preferred culture medium for the present invention has the composition in grams/litre of: $(NH_4)_2HPO_4$, 15; $KH_2PO_4$, 2; $MgSO_4 \cdot 7H_2O$, 0.05; $Na_2SO_4 \cdot 10H_2O$, 0.1; glycerol 20; L-lysine monohydrochloride 0.06.

The cell-free liquid may be obtained from the culture by, for example, centrifugation and thereafter freeing from bacteria by membrane filtration. The lipopolysaccharide complex may be obtained in the form of a complex with lipoprotein when it is separated from products of lower molecular weight in the cell-free liquid, either by gel filtration (for example through Sephadex G–200 or 75), or by ultracentrifugation. Alternatively, for large volumes of culture medium it may be more convenient to separate lipopolysaccharide as a crude complex of lipopolysaccharide with lipoprotein and protein when it is precipitated from the cell-free liquid after dissociation of lipid by for example chloroform extraction, heating or changing the pH to a value between 3 and 5, and thereafter allowing to stand at a temperature below 10° C. More crude lipopolysaccharide complex may be precipitated after the heating or chloroform extraction by adustment of the pH to from 2.5 to 8 before cold storage to improve the yield.

Prior to the addition of the aqueous phenol the complex of lipopolysaccharide may be dried if desired and any lipid present may be removed with an organic solvent to leave a lipopolysaccharide-protein complex.

The complex of lipopolysaccharide with lipoprotein and/or protein may be suspended in water and the suspension dissolved by addition of aqueous phenol; alternatively the lipopolysaccharide complex may be dissolved directly in aqueous phenol. The concentration of phenol should also be such that the water/phenol mixture separates into two phases at temperatures below approximately 10° C. The duration of the treament to form the lipopolysaccharide varies with the temperature, e.g., at lower temperatures longer times will be required and vice versa. Appropriate conditions should be chosen so that maximum dissociation of the lipopolysaccharide complex takes place with minimum degradation of the lipopolysaccharide. When the complex dissociates the protein and lipid if present pass to the phenolic phase and the lipopolysaccharide dissolves in the aqueous phase. Generally a temperature of from 0° to 70° C. and a time of 5 to 30 minutes will be suitable. If a temperature below 10° C. is employed the resulting two phases should be mixed by stirring or shaking during the period of dissociation of the lipopolysaccharide complex.

If necessary the mixture is cooled, preferably to 0° C. to 10° C., whereby separation into an aqueous phase and a phenolic phase takes place. Centrifuging assists clear separation of the two phases into an upper aqueous layer and a lower phenolic layer. The aqueous layer is separated and is freed of dissolved phenol by for example dialysis, gel filtration (e.g., using Sephadex of any suitable grade) or by extraction with a suitable water-immiscible organic solvent, such as ether. It may then be concentrated by evaporation, preferably in a vacuum.

If desired, lipopolysaccharide may be precipitated from the concentrated aqueous extract of the crude lipopolysaccharide by mixing with several times its volume of a water-miscible organic precipitating agent such for example as a lower aliphatic alcohol or ketone or a mixture thereof. The preferred precipitating agents are methanol, ethanol and acetone. The crude lipopolysaccharide is obtained as a flocculent precipitate. Preferably sodium acetate or other alkali metal acetates are added to the precipitating agent. The thus precipitated lipopolysaccharide may then be dissolved in tris buffer (2-amino-2-hydroxymethylpropane-1,3-diol) containing 1–2% ethanol or ether and precipitated with an alkaline-earth metal chloride.

Alternatively lipopolysaccharide may be precipitated directly from the aqueous solution of the lipopolysaccharide by treatment with an alkaline-earth metal chloride. The alkaline-earth metal chloride is preferably magnesium chloride.

When the step of precipitating with an alkaline-earth metal chloride is employed, the resulting precipitate is dissolved in a chelating agent. The preferred chelating agent is ethylene diamine tetra-acetic acid. Metal, chelating agent and any other low molecular weight material present may then be separated by dialysis or gel filtration (for example using Sephadex) to leave substantially pure lipopolysaccharide which may be lyophilised or precipitated with a water-miscible precipitating agent.

Less pure lipopolysaccharide may be obtained as a stable water clear solution when the phenol is removed by dialysis. When the lipipolysaccharide complex is separated from the cell-free liquid by gel filtration low molecular weight constituents have been already removed and aqueous phenol treatment followed by dailysis is sufficient to produce substantially pure water-soluble lipopolysaccharide. Water soluble lipopolysaccharide is however rendered water insoluble by precipitation or freeze drying. The invention accordingly also provides a stable water-soluble lipopolysaccharide derived from a rough gram-negative bacterium.

The aqueous solutions of this material may contain up to 9 mg./ml. of lipopolysaccharide. Such water-soluble lipopolysaccharides cannot usually be extracted from rough strains of bacteria; these R chemotypes usually produce insoluble lipopolysaccharides.

The peculiar behaviour of lysine-requiring mutants of *Escherichia coli* grown under specified conditions cannot yet be satisfactorily explained.

The phenomenon may be recognised by several criteria; firstly, for a given set of cultural conditions there is a narrow concentration range of lysine in the culture medium in which it is operative. Secondly, the lipopolysaccharide complex is antigenic and reacts serologically with antiserum prepared against whole bacteria or the lipopolysaccharide; it is therefore possible to follow its production serologically (for example by quantitative precipitin reaction) and to identify the material in culture filtrates without having to isolate it. The excretion of a variety of products such for example as lipids, diaminopimelic acid, flavins and nucleotides is thought to be characteristic of this particular type of mutant and is not confined to one strain of *Escherichia coli*. The mechanisms of production of these substances, excreted in amounts which are often far in excess of simple leakage or lysis, have yet to be elucidated. It is however thought that all these phenomena result from limitation of the amount of lysine supplied to the growing culture.

Following is a description by way of example of methods of carrying the invention into effect.

EXAMPLE 1

A culture of *Escherichia coli* 12408 was grown overnight at 37° C. under conditions of high aeration in a sterile medium containing (g./l.) $(NH_4)_2HPO_4$, 15; $KH_2PO_4$, 2; $MgSO_4 \cdot 7H_2O$, 0.05; $Na_2SO_4 \cdot 10H_2O$, 0.1; glycerol 20; L-lysine monohydrochloride 0.06; pH adjusted to 7.0. 480 ml. of the overnight culture was used to inoculate 15 litres of the same medium contained in a stirred fermenter (30 l. capacity). The inoculated medium was incubated at 37° C. and air was passed in at the rate of 5 litres per minute. After 26 hours, the bacterial cells were removed from the culture by centrifugation and membrane filtration. The clear (culture filtrate) contained 2.5 mg./ml. of diaminopimelic acid and was dark yellow because of high levels of riboflavin. It was concentrated five fold by vacuum distillation at a temperature below 40° C. and extracted four times with an equal volume of chloroform. The aqueous layer was briefly warmed to 35° C. under reduced pressure to remove chloroform and stored at 4° C. for 72 hours.

The precipitate of crude lipopolysaccharide complex was collected and lyophilised (5.1 g.). 10 g. of this precipitate was suspended in 500 ml. water at 65° C., and 500 ml. of aqueous phenol (90% w./v.) at 65° C. was added. The mixture was stirred at 65–68° C. for 20 minutes, cooled to 4° C. and the resulting two phases separated by centrifuging at 4° C. The lower phenol layer was extracted a second time with 500 ml. water under the same conditions; the pooled aqueous (top) layers were extracted twice with 300 ml. ethyl ether to remove the phenol and then concentrated to 500 ml. in vacuo below 37° C. Ethanol (10 vol.) was added together with a few mg. (a pinch) of sodium acetate and the mixture was left overnight. The resulting precipitate was dissolved in 1750 ml. 0.05 M tris buffer (2-amino-2-hydroxymethyl-propane-1,3-diol) pH 7.2 containing 1% ethanol by 18 hours incubation at 37° C.; $MgCl_2$ (0.25 M) was added to a final concentration of 0.025 M $MgCl_2$ and the mixture was left at 18° C. for several hours. The precipitate, collected by centrifuging, was dissolved in 500 ml. 0.02 M EDTA (ethylene diamine tetra acetic acid) pH 7 by standing (overnight at 37° C.) and the viscous solution was dialysed against 0.001 M EDTA (3 changes) and glass distilled water (2 changes). The dialysed solution was concentrated in vacuo to a small volume and freeze-dried (yield 3 g.). The lipopolysaccharide is a shining white material forming a colloidal solution in water containing small amounts of organic compounds. It is antigenic in rabbits, pyrogenic for rabbits in doses of $2.5 \times 10^{-5}$ μg. per kg. body wt., toxic ($LD_{50}=3$ μg. for 5 day chick embryos), gave local inflammatory response in the skin of sensitised rabbits at dose of 0.5–1 μg. (Schwartzmann reaction), and single doses of 10 μg. produced 6 times enhanced antibody response to ovalbumen (2 mg.) in rabbits. It appears to be homogeneous on electrophoresis in a Perkin Elmer apparatus; it gives a single peak moving towards the anode in pyridine acetic acid buffer pH 6. In the Spinco analytical centrifuge it gives a single peak at pH 6.1 and at pH 8.6 (tris-EDTA buffer) with sedimentation constants S of 8 and 58 respectively.

The overall analysis is as follows, figures being percentages by weight; C, 43.04; H, 7.30; N, 1.09; P, 3.95; ketodeoxyoctonic acid, 3.0; glucosamine, 6.2; D-glucose, 9.5; D-galactose, 10.1; heptose, 18.9; ethanolamine, 1.0 (approx.); fatty acids, 19. A short hydrolysis ($1NH_2SO_4$, 100° C. for 30 minutes) releases an insoluble lipid material (27.5% by weight of original) which contains 74.9% fatty acids (mainly lauric, myristic, β-OH myristic and palmitic acids); 21% glucosamine; 2.75% P. The lipid thus resembles a long-chain fatty acid derivative of poly(phospho-D-glucosamine) which is designated lipid A and is a component split by similar acid treatment from intra-cellular bacterial lipopolysaccharides. After removal of lipid, the remaining water-soluble polysaccharide contained mainly phosphorus, glucose, galactose, a heptose sugar, and 2-keto-3-deoxyoctonic acid. These components are those of the polysaccharide portions of lipopolysaccharide from rough strains of *Salmonellae chemotype* Rb (L. Luderitz, A.M. Staub, O. Westphal, Bact. Rev. 30, 193, 1966, table 15). *Escherichia coli* 12408 used in this experiment was also a rough strain.

EXAMPLE 2

2.5 litres of culture filtrate prepared as in Example 1 was concentrated by vacuum distillation to 400 ml. and put on to a column consisting of 400 g. of Sephadex G–75 and washed through with water; immediately after the void volume (1250 ml.) an opalescent solution giving a reaction for carbohydrate came through in 540 ml. Part of the resulting solution of lipopolysaccharide-lipoprotein complex was lyophilised; it had the following analysis: 3.0% nitrogen, 3.2% phosphorus, 11.6% heptose, 8.0% glucose, 27% extractable lipid and 10% protein. The solution gave a strong reaction with homologous immune serum.

Part of the solution (100 ml.) was mixed with an equal volume of aqueous phenol and heated at 65° C. for 10 minutes to 4° C. and the resulting two phases separated by centrifuging at 4° C. The phase containing lipopolysaccharide was dialysed free from phenol and lyophilised. The product contained 19.4% heptose, 8.9% glucose, 1.54% N and 4.0% P.

EXAMPLE 3

2.0 grams of the crude lipopolysaccharide complex precipitated and lyophilised as in Example 1 was suspended in 80 ml. of ice cold water and mixed with 247 ml. of cold aqueous 40% (w./v.) phenol. The mixture was shaken vigorously and then stirred for 30 minutes at 4° C. It was separated into 2 phases by centrifuging at 0° C. The aqueous phase (80 ml.) was freed from phenol by dialysis for 7 days against water at 4° C. and centrifuged for 1 hour at 100,000 g. The clear aqueous viscous supernatant liquid contained 9 mg./ml. lipopolysaccharide with a heptose content of 16.8%, a ketodeoxyoctonic acid content of 2.3% and sedimentation constant in the ultra centrifuge of 4.9 S (pH 4.6). The diluted liquid gave a strong precipitin reaction with antiserum prepared against lipoglycopeptide and was toxic for 5 day-old chick embryos ($LD_{50}$ 6 μg).

EXAMPLE 4

A culture of *Escherichia coli* 12408 was grown and inoculated as in Example 1 in 15 litres of a sterile medium containing (per litre) phosphoric acid, 85 ml.; hydrochloric acid 6.6 ml.; 2 N KOH, 73 ml.; 2 N $H_2SO_4$, 10 ml.; 2 N NaOH, 3 ml.; 0.880 ammonia, 135 ml.; L-lysine hydrochloride, 0.06 g.; $MgCl_2 \cdot 6H_2O$, 0.04 g.; sucrose, 200 g.; pH adjusted to 7.0.

After removal of bacterial cells from the culture by centrifugation and membrane filtration, the liquid contained 0.5 mg./ml. of diaminopimelic acid. 5 Litres was adjusted to pH 3.5 with HCl and stood for 24 hours at +2° C. The resulting precipitate of lipopolysaccharide-lipoprotein complex was collected, suspended in 25 ml. water at 65° C., 25 ml. of aqueous phenol (90 w./v.) was added and the mixture was stirred at 67° C. for 10 minutes, cooled to 1° C. and left for 90 minutes. The two phases were separated after centrifuging at 4° C. and the top aqueous layer was dialysed free from phenol and freeze dried. 127 mg. of lipopolysaccharide was obtained containing 19.7% heptose, 9.75% glucose and 3.24% phosphorus. The material was insoluble in water but was dissolved in 15 ml. of 1% phenol; after it was treated with 150 ml. of ethanol in the presence of a trace of sodium acetate the precipitate was collected, suspended in water, dialysed and freeze dried. It contained 18.7% heptose, 9.9% glucose, 4.2% phosphorus.

EXAMPLE 5

A culture of *Shigella sonnei* 10679 which requires nicotinamide as well as lysine for growth was used. The organism was grown at 37° C. under conditions of high aeration in sterile media containing (g./l.) $KH_2PO_4$, 3; $K_2HPO_4$, 7; $(NH_4)_2SO_4$, 1; $MgSO_4 \cdot 7H_2O$, 0.01; sodium citrate, 0.5; glucose, 10; nicotinamide, 0.01; L-lysine hydrochloride from 0.006 to 0.08. After 48 hours formaldehyde was added to a final concentration of 1%, and after 2 hours the killed bacterial cells were removed by centrifugation and membrane filtration. The amounts of diaminopimelic acid and non-dialysable carbohydrate (expressed as glucose) in the cell-free liquid are given in the following table.

| Growth medium, L-lysine. HCl (g./l.) | Cell-free liquid | |
|---|---|---|
| | Diaminopimelic acid (mg./ml.) | Non-dialysable carbohydrate (mg./ml.) |
| 0.006 | 0.034 | 0.079 |
| 0.012 | 0.156 | 0.112 |
| 0.020 | 0.256 | 0.096 |
| 0.025 | 0.214 | 0.094 |
| 0.040 | 0.160 | 0.099 |
| 0.060 | 0.044 | 0.091 |
| 0.080 | 0 | 0.054 |

The cell-free liquid from the sample containing 0.025 g. per litre of L-lysine hydrochloride was concentrated five times and washed with water through a column of Sephadex G–25. Immediately after the void volume, an opalescent carbohydrate-containing material (lipopolysaccharide complex) was obtained which gave a precipitin reaction with immune serum against *Shigella sonnei*.

Lipopolysaccharide is obtained from the crude lipopolysaccharide-lipoprotein by treatment with a mixture of a phenol and water.

EXAMPLE 6

*Escherichia coli* 12408 was grown in aerated sterile media containing the following inorganic constituents in grams/litre: $(NH_4)_2HPO_4$, 15; $KH_2PO_4$, 2; $MgSO_4 \cdot 7H_2O$ 0.05; $Na_2SO_4 \cdot 10H_2O$, 0.1; lysine and the source of assimilable carbon were as given in the following table.

After 40 hours at 37° C. most bacterial cells were removed by centrifugation and diaminopimelic acid was measured in the cell-free liquid. The results were as given in the following table.

| L-lysine.HCl, mg./litre | Carbon source, g./litre | Diaminopimelic acid mg./ml. |
|---|---|---|
| 40 | Glycerol, 25 | 1.8 |
| 54 | do | 2.09 |
| 72 | do | 0.7 |
| 54 | glucose, 10 | 1.22 |
| 72 | do | 0.8 |

I claim:

1. A process for the preparation of a lipopolysaccharide which process comprises growing a lysine-requiring mutant of a bacteria selected from the group consisting of *Escherichia coli* and *Shigella sonnei* in a sub-optimal concentration of lysine below about 500 mg./litre, obtaining a cell-free liquid from the resulting culture, separating lipopolysaccharide-complex from the cell-free liquid, obtaining lipopolysaccharide by treatment of the complex with a mixture of a phenol and water and removing the phenol.

2. A process as claimed in claim 1 wherein the bacteria is *Escherichia coli* which is grown under conditions such that diaminopimelic acid accumulates in the culture medium.

3. A process as claimed in claim 2 wherein the lysine concentration is between 20 and 500 mg./litre and the lysine-requiring mutant is grown under conditions of high aeration.

4. A process as claimed in claim 3 wherein the pH of the culture is between 5 and 8 and the lysine-requiring mutant is grown for 24 to 48 hours at a temperature of from 25° to 40° C.

5. A process as claimed in claim 1 wherein a lipopolysaccharide-lipoprotein complex is separated from products of lower molecular weight in the cell-free liquid by gel filtration or by ultracentrifugation.

6. A process as claimed in claim 1 wherein crude lipopolysaccharide-lipoprotein-protein complex is precipitated from the cell-free liquid after dissociation of lipid by chloroform extraction, heating or changing the pH to a value between 3 and 5 and thereafter allowing to stand at a temperature below 10° C.

7. A process as claimed in claim 1 wherein prior to the addition of aqueous phenol the lipopolysaccharide complex is dried.

8. A process as claimed in claim 7 wherein all lipid is removed from the lipopolysaccharide complex with an organic solvent to leave a lipopolysaccharide-protein complex.

9. A process as claimed in claim 1 wherein the lipolysaccharide complex is suspended in water and the suspension dissolved by addition of aqueous phenol.

10. A process as claimed in claim 9 wherein the concentration of phenol is such that the water/phenol mixture separates into two phases at temperatures below approximately 10° C.

11. A process as claimed in claim 9 wherein the temperature of the mixture is adjusted to between 0° C. and 10° C. and separation into an upper aqueous layer and a lower phenolic layer is effected.

12. A process as claimed in claim 11 wherein the aqueous layer is separated and freed of dissolved phenol by dialysis or by extraction with a water-immiscible organic solvent.

13. A process as claimed in claim 12 wherein lipopolysaccharide is precipitated from the aqueous extract of the crude lipopolysaccharide by mixing with several times its volume of a water-miscible organic precipitating agent comprising a lower aliphatic alcohol or ketone or a mixture thereof.

14. A process as claimed in claim 13 wherein the precipitating agent is ethanol.

15. A process as claimed in claim 13 wherein sodium acetate is added to the precipitaing agent.

16. A process as claimed in claim 13 wherein the precipitated lipopolysaccharide is dissolved in tris buffer containing 1–2% ethanol or ether.

17. A process as claimed in claim 12 wherein lipolpolysaccharide is precipitated from an aqueous extract of lipopolysaccharide by treatment with an alkaline-earth metal chloride.

18. A process as claimed in claim 17 wherein the alkaline-earth metal chloride is magnesium chloride.

19. A process as claimed in claim 17 wherein the precipitate of lipopolysaccharide is dissolved in a chelating agent.

20. A process as claimed in claim 19 wherein the chelating agent is ethylene diamine tetraacetic acid.

21. A process as claimed in claim 17 wherein the precipitated lipopolysaccharide is purified by dialysis or gel filtration to leave substantially pure lipopolysaccharide.

22. A process as claimed in claim 21 wherein the substantially pure lipopolysaccharide is lyophilised or precipitated with a water-miscible precipitating agent.

References Cited

UNITED STATES PATENTS

| 3,089,821 | 5/1963 | Folkers | 167—78 |
| 3,148,120 | 9/1964 | Westphal | 167—78 |

LIONEL M. SHAPIRO, *Primary Examiner.*

U.S. Cl. X.R.

195—96; 424—92